United States Patent [19]

Meuth

[11] Patent Number: 5,866,218

[45] Date of Patent: Feb. 2, 1999

[54] PIPE END LOAD SUPPORT AND PROTECTOR APPARATUS

[75] Inventor: Thomas Larry Meuth, Spring, Tex.

[73] Assignee: Offshore Clamp & Protector Technologies, Inc., Spring, Tex.

[21] Appl. No.: 702,752

[22] Filed: Aug. 23, 1996

[51] Int. Cl.⁶ .............................. B65D 59/02; B65D 59/06
[52] U.S. Cl. ........................................................... 428/36.5
[58] Field of Search ............................................. 428/36.5

[56] References Cited

U.S. PATENT DOCUMENTS

| | | | |
|---|---|---|---|
| 3,779,298 | 12/1973 | Piccirilli | 428/36.5 |
| 4,546,900 | 10/1985 | Lackey | 428/36.5 |

OTHER PUBLICATIONS

Oertel, G. *Polyurethane Handbook* pp. 284–285, Hanser Publishers, NY 1994.

*Primary Examiner*—Patricia A. Short
*Attorney, Agent, or Firm*—Pravel, Hewitt, Kimball & Krieger

[57] ABSTRACT

A pipe end load support and protector apparatus for attaching to an end of a pipe to protect the pipe end. The apparatus comprising a circular member having an outer diameter approximating the outer diameter of the pipe end. The circular member has an end bearing portion made of a closed cell rigid polyurethane foam. The closed cell rigid polyurethane foam has a density in the range of about 40 to 70 pounds per cubic foot.

19 Claims, 2 Drawing Sheets

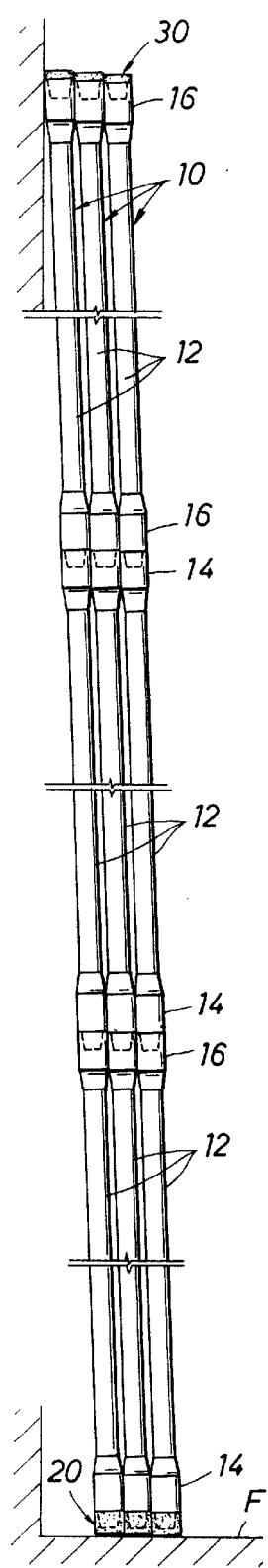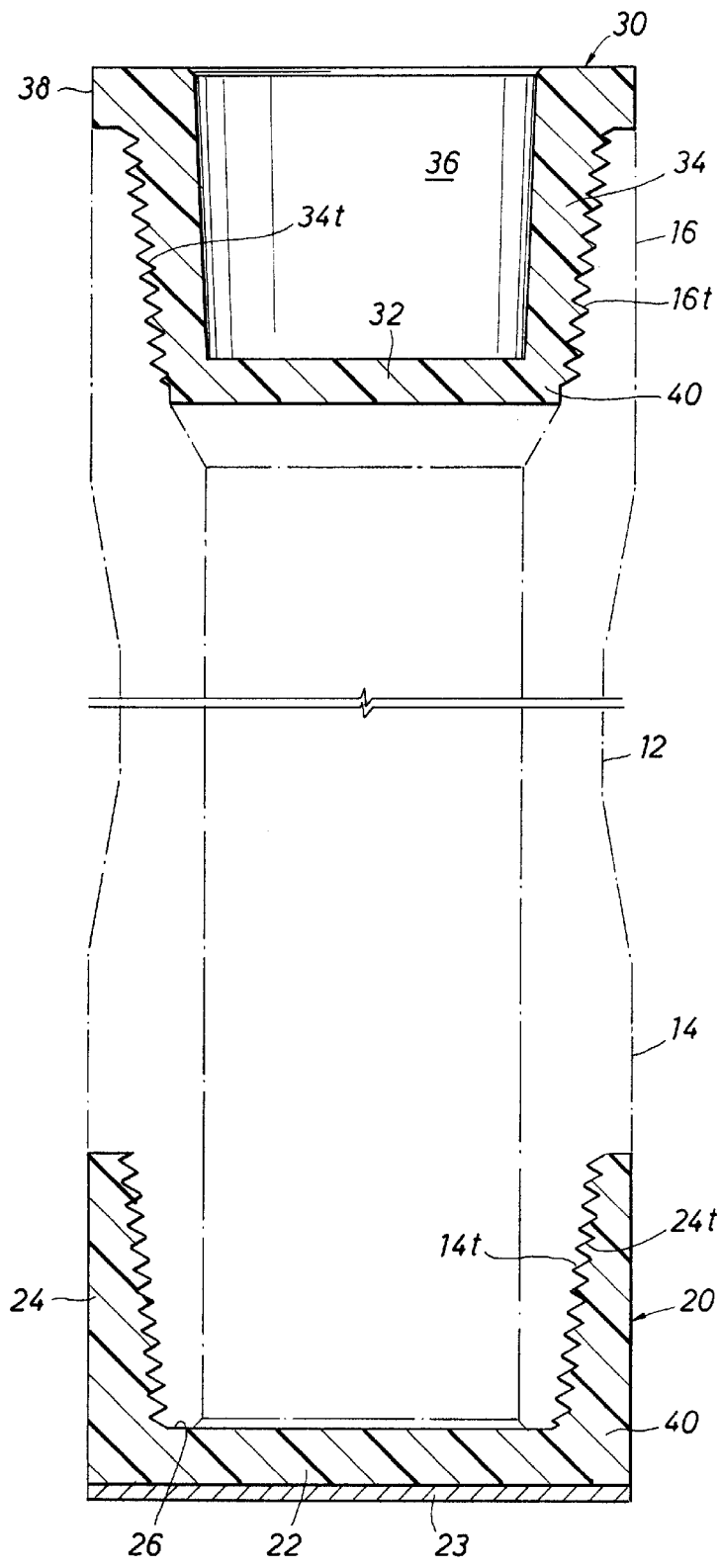
FIG.1
FIG.2

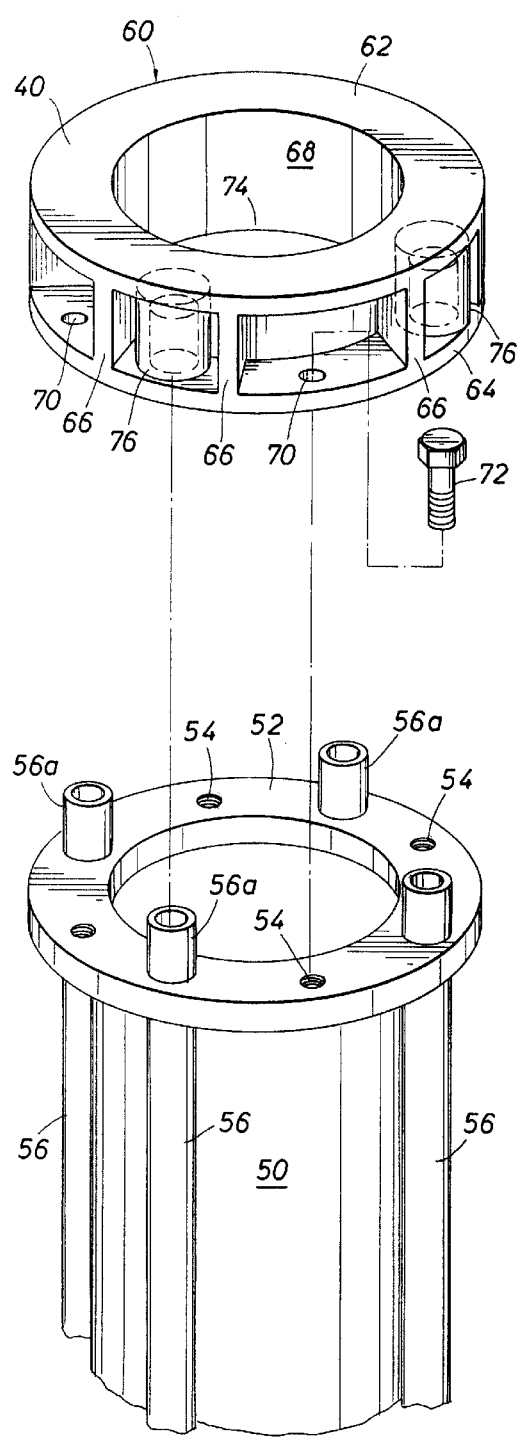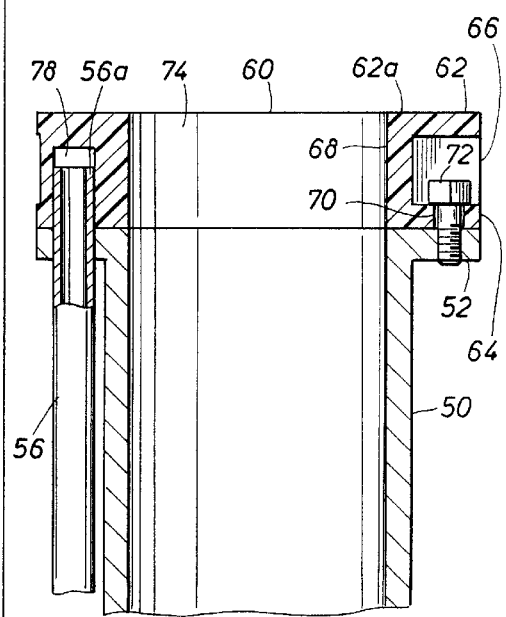

PIPE END LOAD SUPPORT AND PROTECTOR APPARATUS

BACKGROUND OF THE INVENTION

1. Field of the Invention

The present invention relates generally to protectors for drill pipe and riser joints, and more particularly to pipe end load supports and protectors.

2. Description of the Prior Art

The drill pipe string, in the drilling of onshore and offshore well bores in the oil and gas industry, is typically comprised of a plurality of threadably coupled drill pipe joints. Each drill pipe joint, typically about 30 feet in length, includes tool joints welded to the ends of a drill tube segment. The tool joints have threaded ends to form the threaded connection between the drill pipe joints in making up the drill pipe string. Typically, the tool joint at the upper end has internal threads, commonly referred to as the "box," and the tool joint at the lower end has external threads, commonly referred to as the "pin." When a drill pipe string is made up, i.e., a series of drill pipe joints threadably connected, the downwardly extending pin is stabbed into the upwardly extending box and the connection tightened.

At various times during the drilling of a well, it may become necessary to pull the pipe string out of the well bore, commonly referred to as "tripping out" of the hole. Typically, stands of drill pipe are vertically racked in the drilling rig derrick or mast when making a trip. The term for storing pipe in this fashion in the derrick is referred to as "racking-back pipe" or "standing-back pipe." Presently, pipe is being racked-back up to three to four joints of pipe joined together. Racking-back the pipe saves rig time by sending pipe joints subsea in multiples instead of joint by joint. The usual stand is approximately 90 feet long comprising three pipe joints screwed together. Stands of three pipe joints are called "tribbles." Stands may also be "doubles," comprising two pipe joints screwed together, or "fourbles," comprising four pipe joints screwed together. The stands may comprise drill pipe, casing or tubing.

The stands are racked in a substantially vertical position with the entire weight of the stand resting on the pin of the lowermost joint. It is very important to protect the external threads of the pin against damage so that the joint can be made up when "tripping in" the hole.

It is to be understood that this technique of storing stands of pipe also applies to large diameter casing and risers which may have either threaded ends, flanges or some other couplings, as for example, a slip joint with locking type connectors. Additionally, it is also important to protect both pipe ends during storage and transportation of the pipe joints.

Various types of protectors have been used in the past. For pipes having threaded ends, the past preferred method is the use of a molded thread protector which is either injection molded or pour molded with an elastomeric polyurethane polymer system. The elastomeric polyurethane polymer is a noncellular flexible polyurethane polymer which does a reasonable job of protecting the threads when it is used with a steel shell lined with the flexible polyurethane. Without the steel shell, the flexible polyurethane provides marginal thread protection at best, especially for larger diameter pipes. The load-bearing properties of this type of polyurethane is not sufficient to stand up to the loads generated by standing and storing in a upright position stands of pipe.

As stated above, most riser systems and drill pipe have the pin end down when it is being lowered subsea. Thus, the pin end is the one that normally has the most probability of being damaged due to the amount of weight resting on its end, especially if it is "bumped down" on the rig floor when being moved in and out of storage or use. The pin protectors made of the elastomeric polyurethane can be ruined by the weight of the stands crushing and/or shearing the urethane along its threaded surface or on the bottom of the urethane protector which allows metal to metal contact with the end or sides of the pipe, possibly damaging the threads or the end of the pipe which would prevent a good coupling or seal.

For pipes that have a slip joint with a locking connector or flange connection, the preferred method in the past for large diameter pipe and large diameter pipe having smaller pipes, such as choke and kill lines attached to it, is to fabricate a steel protector which encloses the entire pin end of the pipe and is fastened to the pipe by bolts which are screwed against the outside or inside of the main pipe. On flanged pipe, the protector is bolted directly to the flange. On pipes that are not flanged, the pipes cannot be set on the ends without the possibility of damaging the end because the steel protector can slide on the outside diameter of the pipe and come to rest on the pin ends of the pipe. These steel protectors are usually fabricated from A36 steel and are very heavy making them cumbersome, hard to handle, as well as potentially dangerous to the workers.

It is desirable to have a pipe end load support and protector which is lightweight while having the required strength to withstand the loads to which it is subjected. It is also desirable to have a pipe end load support and protector which is easy to manipulate, install and remove and which is economical to manufacture. It is also desirable that it can be used with pipe stands or with pipe stored or transported horizontally.

SUMMARY OF THE INVENTION

The pipe end load support and protector apparatus of the present invention is lightweight and has the required strength to withstand the loads to which it is subjected. The pipe end load support and protector apparatus is easy to manipulate, install and remove and is economical to manufacture. The support and protector apparatus can be effectively and efficiently used with pipe stands or with pipe stored or transported horizontally.

The pipe end load support and protector apparatus comprises a circular member having an outer diameter approximating the outer diameter of the pipe end. The circular member has an end bearing portion made of a closed cell rigid polyurethane foam. The closed cell rigid polyurethane foam has a density in the range of about 40 to 70 pounds per cubic foot. The pipe end load support and protector apparatus includes attaching means for attaching the device to the pipe end.

BRIEF DESCRIPTION OF THE DRAWINGS

In order to more fully understand the drawings referred to in the detailed description of the present invention, a brief description of each drawing is presented, in which:

FIG. 1 is an elevational view of three stands of pipe vertically positioned having threaded pipe end load support and protector apparatus according to a first embodiment of the present invention mounted to lowermost pins and uppermost boxes;

FIG. 2 is a vertical sectional view of the pipe end load support and protector apparatus for the threaded pin and box end of a pipe;

FIG. 3 is an exploded view of a second embodiment of the pipe end load support and protector apparatus and a pipe with external smaller pipes attached thereto having a slip joint with a flange connection; and FIG. 4 is a sectional view of the second embodiment of the pipe end load support and protector apparatus mounted to the pipe with the section taken through an angle of 135 degrees.

DETAILED DESCRIPTION OF PREFERRED EMBODIMENT

Referring now to the drawings in greater detail, three stands 10 of pipe 12 are shown in a substantially vertical position. Referring to FIGS. 1 and 2, the pipe 12 is shown as drill pipe having a lowermost externally threaded pin tool joint 14 and an uppermost internally threaded box tool joint 16. As shown in FIG. 1, each stand 10 is comprised of three joints of pipe 12 which are threadably connected to one another. FIG. 1 illustrates the typical orientation of the stands 10 when stored in a drilling rig's derrick or mast. The stands 10 are vertically supported on a floor F. Typically, the stand 10 is resting on the pin 14 as shown in FIG. 1.

A first embodiment of a pipe end load support and protector apparatus according to the present invention is shown in FIGS. 1 and 2. The pipe end load support and protector apparatus includes a pin end protector 20 and a box end protector 30.

Referring to FIG. 2, the pin end protector apparatus 20 is preferably a cup-shaped member having a circular wall 24 attached to a round base 22 defining an interior recess 26. The wall 24 includes interior threads 24t adapted to engage external threads 14t of the pin 14. Preferably, the round base 22 is solid to protect against foreign objects getting into the interior of the pipe 12.

In instances where the end of the pipe 12 has insufficient surface area to support the load or weight of the stand 10 (as for example resulting from tapered threads), the interior threads 24t also become load bearing to provide load distribution through both the end of the pipe 12 and the external threads 14t of the pin 14.

Although not required, it may be desirable to include a rubber-like pad 23 to the round base 22 to provide some additional shock absorbing capacity to the pin end protector apparatus 20. The rubber-like pad 23 can be adhered, as for example with epoxy, to the load bearing end of the pin end protector 20.

Still referring to FIG. 2, the box end protector apparatus 30 is preferably a cup-shaped member having a circular wall 34 attached to a round base 32 defining an interior recess 36. It is to be understood that the interior recess 36 could be eliminated if desired. The wall 34 includes exterior threads 34t adapted to engage internal threads 16t of the box 16. The box end protector apparatus 30 includes a rim 38 attached to the wall 34 opposite the round base 32. Preferably, the rim 38 has an outer diameter corresponding to the outer diameter of the box 16 as shown in FIG. 2. Preferably, the round base 32 is solid to protect against foreign objects getting into the interior of the pipe 12.

The preferred material to make the pin end protector apparatus 20 and the box end protector apparatus 30 is a closed cell rigid polyurethane foam (CCRPU foam) 40. CCRPU foam 40 creates its cellular form through its particular formulation and the use of a blowing agent which gives it the ability to create cells and expand. The introduction of air into the mixing chamber during the molding creates more expansion and decreases the density of the material. Conversely, if the amount of introduced air is decreased, the density of the CCRPU foam 40 can be increased to approximately 70 pounds per cubic foot (pcf). A CCRPU foam 40 having a density of approximately 70 pcf has a compressive strength of 15,000 pounds per square inch (psi) with only a deflection of 10% whereas a CCRPU foam 40 having a density of approximately 40 pcf has a compressive strength of 4,000 psi. CCRPU foam 40 can be poured or injected into a cavity mold to make the pin end and box end protectors 20 and 30, respectively. It is anticipated that a CCRPU foam having a density in the range of approximately 40–70 pcf will have the desired characteristics for the load support and protectors of the present invention. Preferably, a foam density of 55–65 pcf will have the desired characteristics for the load support and protectors of the present invention for most oilfield applications. Preferably, the CCRPU foam has a compressive strength in the range of 10,000–15,000 psi to be able to withstand the loads to which the load support and protectors will be subjected.

The CCRPU foam 40 provides a lightweight (as compared to steel which has a density of 490 pcf), high strength material which can be molded to economically manufacture the protectors 20 and 30.

Referring to FIG. 3, a riser pipe joint 50 is shown having a flange 52 mounted thereto. Although not shown, it is to be understood that the riser pipe 50 has a second end with a flange connected thereto. The flange 52 includes a plurality of holes 54 for connecting the flange 52 to a mating flange having corresponding holes (not shown) on another riser pipe joint. As shown in FIG. 3, the riser pipe joint 50 may include a plurality of smaller pipes 56 mounted to the flange 52 and running the length of the riser pipe joint 50. The smaller pipes 56 may include choke and kill lines as well as other lines which are commonly needed during the drilling/production of an oil and gas well. Typically, the smaller pipes 56 have an extending end portion 56a which extends through the flange 52 a slight distance. The end portions 56a are received within the mating flange (not shown) of another riser pipe joint.

The upper portion of FIG. 3 shows the pipe end load support and protector apparatus 60 for the riser pipe joint 50. Referring to FIGS. 3 and 4, the load support and protector apparatus 60 includes a first flange 62 and a second flange 64 having a plurality of radially-extending transverse ribs 66 therebetween. An inner sleeve portion 68 also spans between the flanges 62 and 64 and intersects with the transverse ribs 66 to form an integral assembly. The second flange 64 includes a plurality of holes 70 therethrough which align with the holes 54 in the flange 52 for securing the load support and protector apparatus 60 to the riser pipe joint 50. As shown in FIG. 4, a fastener 72, as for example a bolt, can be inserted into the hole 70 and threadably engage the hole 54 in the riser pipe joint flange 52. If desired, the hole 54 could be a non-threaded bore and a nut would be used with the bolt 72 to secure the load support and protector apparatus 60 to the riser pipe joint 50. As shown in FIG. 4, the fastener 72 is situated below a bearing surface 62a of the load support and protector apparatus 60 and is thus protected from damage.

The load support and protector apparatus 60 is shown as having a central bore opening 74 extending therethrough. It is to be understood that the load support and protector apparatus 60 could also be closed as shown in FIG. 2.

The load support and protector apparatus 60 also includes a plurality of receptacles 76 for receiving the end portions 56a of the smaller pipes 56. The receptacles 76 include an inner bore 78 sized to receive the end portions 56*a*. As shown in FIG. 4, the receptacles 76 are situated below the bearing surface 62*a* of the load support and protector apparatus 60 and the inner bore 78 extends through the second flange 64. Thus, the receptacles 76 protect the end portions 56*a* from damage. Although not shown, it is to be understood that the inner bore 78 of the receptacles 76 could be lined with rubber to provide additional protection to the end portions 56*a*.

It is to be understood that the load support and protector apparatus 60 is preferably made from CCRPU foam 40 for the reasons explained above. Although not shown, it may be desirable to include a rubber-like pad to the first flange 62 to provide some additional shock absorbing capacity to the loadsupport and protector apparatus 60. The rubber-like pad can be adhered, as for example with epoxy, to the load bearing end of the load support and protector apparatus 60.

Although not shown, it is to be understood that a blind flange could also be manufactured from CCRPU foam and mounted to the opposite flange (not shown) of the riser pipe joint 50.

It is to be understood that the present invention is applicable to any size of pipe or type of pipe end, including threaded, slip joint with a locking type connector or flange connection. For example, typically drill pipe is 4½", 5%₁₆", or 6⅝" diameter having threaded pin and box ends whereas risers may have a diameter exceeding 20" with slip joint type connectors. Indeed, while the present invention has been described with reference to the oil field, it is to be understood that the present invention has applicability to numerous other applications where pipe ends require support and protection. The present invention is versatile and can be molded to fit the particular application.

It is also to be understood that the load support and protectors 20, 30 and 60 of the present invention can be manufactured as a composite design. The CCRPU foam could include fiberglass or steel reinforcing for additional strength characteristics. Fillers, as for example chopped fiberglass, calcium carbonate, glass bead, teflon, nylon, or acetal can be injected in the molding process. Alternatively, the CCRPU foam could be used for the end support portion with an elastomeric polyurethane polymer used for the threaded portion of the device.

Another significant advantage of the present invention is the ability to mold the load support and protector apparatus with the desired strength characteristics. Thus, if the load support and protector apparatus is to support a 10,000–15,000 pound stand of drill pipe, the load support and protector apparatus will be made of a CCRPU foam having a greater density than if only required to withstand a force of 1,000 pounds. This further results in optimizing the costs associated with each particular load support and protector apparatus.

The foregoing disclosure and description of the invention is illustrative and explanatory thereof, and various changes in the size, shape, and materials, as well as in the details of illustrative construction and assembly, may be made without departing from the spirit of the invention.

What is claimed is:

1. An apparatus for attaching to an end of a pipe to protect the pipe end, the apparatus comprising a circular member having an outer diameter approximating the outer diameter of the pipe end, said circular member having an end bearing portion, said end bearing portion made of a closed cell rigid polyurethane foam having a density in the range of about 40 to 70 pounds per cubic foot.

2. The apparatus of claim 1, wherein said closed cell rigid polyurethane foam has a density in the range of about 55 to 65 pounds per cubic foot.

3. The apparatus of claim 1, wherein said closed cell rigid polyurethane foam has a compressive strength in the range of approximately 4,000 to 15,000 pounds per square inch.

4. The apparatus of claim 1, wherein the pipe end includes a threaded portion and said circular member further comprises a circular wall attached to said end bearing portion, said circular wall having threads thereon to engage the threaded portion of the pipe end.

5. The apparatus of claim 4, wherein said circular member is molded.

6. The apparatus of claim 1, further comprising a rubber-like pad attached to said end bearing portion.

7. The apparatus of claim 1, wherein the pipe end includes a flange having holes therein and said circular member further comprises a plurality of holes for attaching said circular member to the pipe flange.

8. The apparatus of claim 7, wherein said plurality of holes in said circular member are recessed.

9. The apparatus of claim 7, wherein the pipe end includes a small pipe mounted externally of the pipe and having a short end portion extending beyond the flange, said circular member further comprises a receptacle for receiving the short end portion.

10. An apparatus for attaching to an end of a pipe to protect the pipe end, the apparatus comprising a molded member having an outer diameter approximating the outer diameter of the pipe end, said molded member having an end bearing portion and a circular wall connected to said end bearing portion, said molded member made of a closed cell rigid polyurethane foam having a density in the range of about 40 to 70 pounds per cubic foot.

11. The apparatus of claim 10, wherein said closed cell rigid polyurethane foam has a density in the range of about 55 to 65 pounds per cubic foot.

12. The apparatus of claim 10, wherein said closed cell rigid polyurethane foam has a compressive strength in the range of approximately 4,000 to 15,000 pounds per square inch.

13. The apparatus of claim 10, wherein the pipe end includes a threaded portion and said circular wall has threads thereon to engage the threaded portion of the pipe end.

14. The apparatus of claim 13, wherein the pipe has a weight and the weight of the pipe is distributed through said threads and said end bearing portion.

15. The apparatus of claim 10, wherein the pipe end includes a flange and a small pipe mounted externally of the pipe and having a short end portion extending beyond the flange, said molded member further comprising a receptacle for receiving the short end portion.

16. The apparatus of claim 15, further comprising means for attaching said molded member to the pipe end.

17. The apparatus of claim 16, wherein the pipe end flange has holes therein and said attaching means comprises:

a plurality of recessed holes in said molded member; and a plurality of fasteners to extend through said recessed holes and the flange holes to attach said molded member to the pipe end.

18. An apparatus for attaching to an end of a pipe to protect the pipe end, the apparatus comprising a circular member having an outer diameter approximating the outer diameter of the pipe end, said circular member having an end bearing portion, said end bearing portion made of a closed cell rigid polyurethane foam having a compressive strength in the range of approximately 4,000 to 15,000 pounds per square inch.

19. The apparatus of claim 18, wherein the pipe end includes a threaded portion and said circular member further comprises a circular wall attached to said end bearing portion, said circular wall having threads thereon to engage the threaded portion of the pipe end.

\* \* \* \* \*